United States Patent [19]

Dubois

[11] 4,025,299
[45] May 24, 1977

[54] BAKING OVEN

[76] Inventor: Jocelyn Dubois, 3344 Montpetit, Ste-Foy, Quebec, Canada

[22] Filed: Mar. 29, 1976

[21] Appl. No.: 671,576

[30] Foreign Application Priority Data

Feb. 18, 1976 Canada .............................. 246068

[52] U.S. Cl. ................................ 432/129; 432/162; 432/167; 99/329 RT; 99/373; 219/521; 126/19 R; 126/275 R
[51] Int. Cl.² ...................... F27D 3/00; A21B 3/07
[58] Field of Search .......... 432/129, 162, 141, 167; 214/18 R; 126/19 R, 275 R, 275 E; 99/386, 329 RT, 443 C, 373; 34/172, 174; 219/385, 387, 521

[56] References Cited

UNITED STATES PATENTS

| 794,313 | 7/1905 | Rice | 34/172 |
|---|---|---|---|
| 1,694,211 | 12/1928 | Fernandez | 126/19 R |
| 1,769,893 | 7/1930 | Uhl | 99/329 RT |
| 3,118,574 | 1/1964 | Comte | 34/172 |
| 3,776,124 | 12/1973 | Morley | 99/373 |

Primary Examiner—John J. Camby
Assistant Examiner—Henry C. Yuen

[57] ABSTRACT

The oven includes a baking compartment and a lower compartment located beneath the baking compartment for receiving baked articles therefrom; a horizontal shelf separates the baking compartment from the lower compartment and is formed of a series of pivotable plates; means are provided for pivoting the plates at predetermined time to cause the baked articles in the baking compartment to fall under the action of gravity in the lower compartment.

8 Claims, 6 Drawing Figures

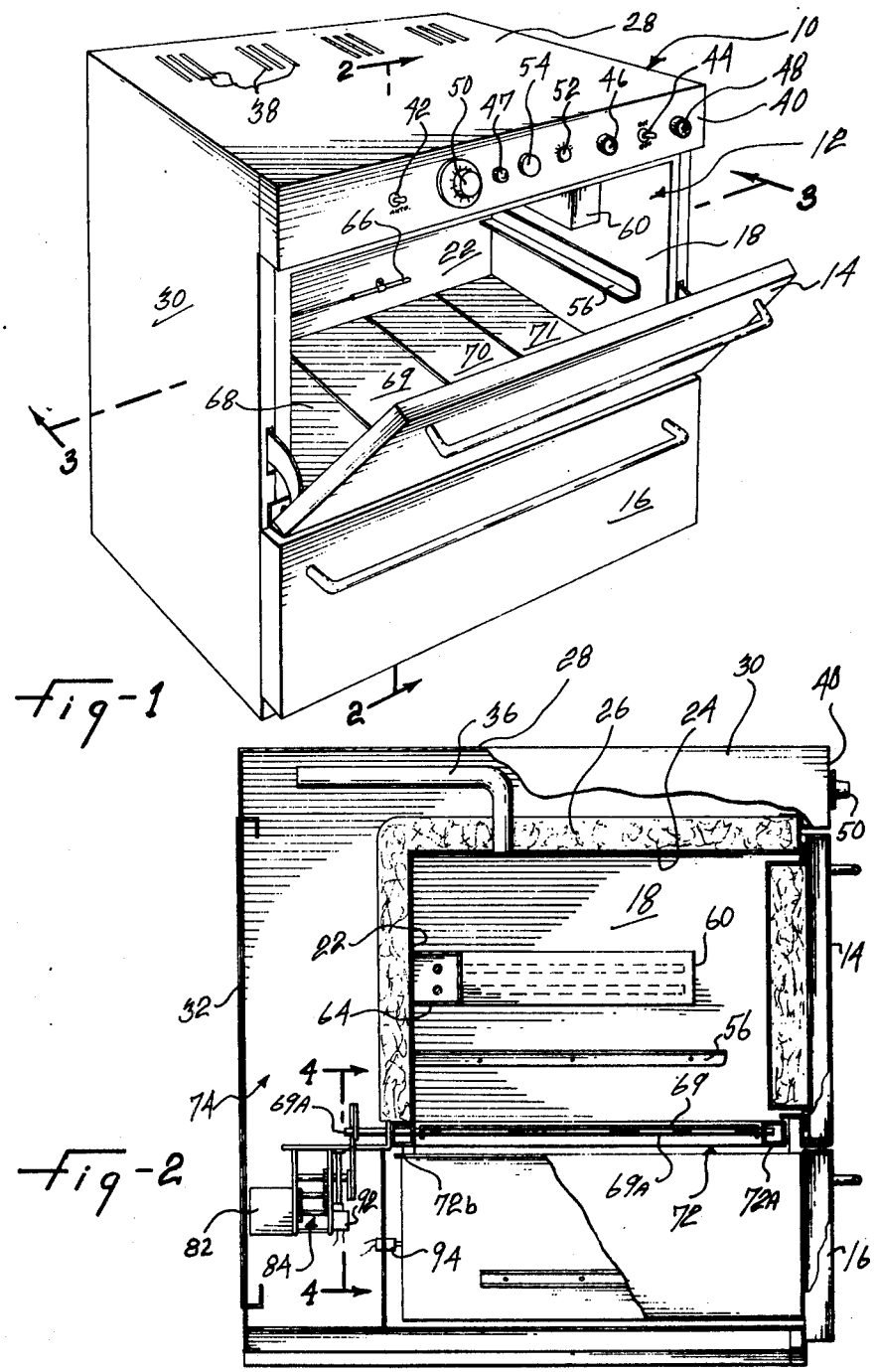

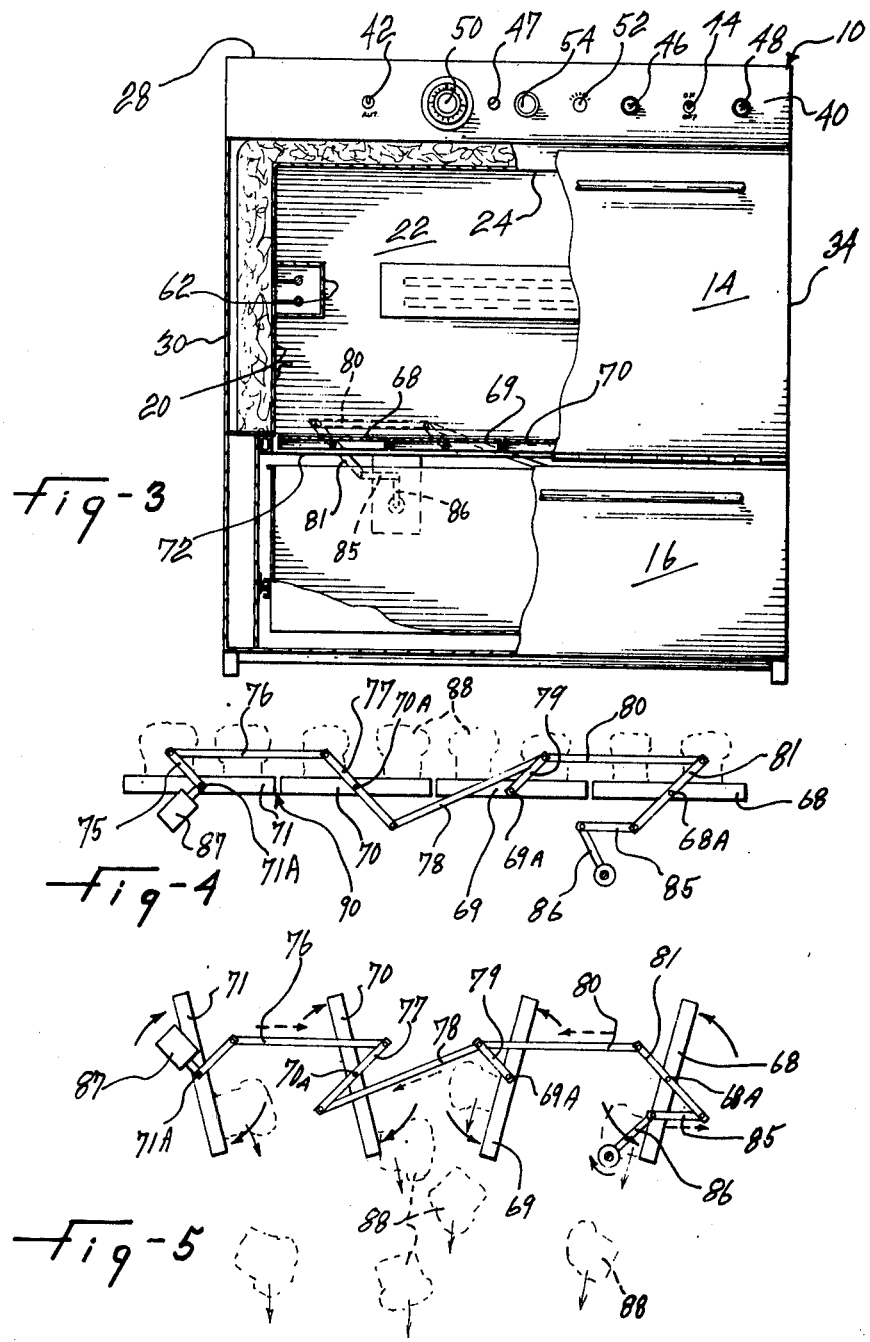

BAKING OVEN

FIELD OF THE INVENTION

This invention relates to an oven for baking cakes, bread and other articles and, more particularly, to an oven where the articles, once baked, are automatically removed from the baking compartment of the oven for storage.

BACKGROUND OF THE INVENTION

Some ovens are known, such as the one described in U.S. Pat. No. 2,038,361 issued Apr. 21, 1936 to Hawes, where a turning and ejecting device is used so that, after the baking operation has been completed, a pan carrying the article being baked is dumped in a manner to deposit the cake, bread or the like on a support ready for removal.

However, such oven has no use in places, such as restaurants, where articles like bread, muffins or rolls are continuously served to customers. These articles are baked or bought in advance in a quantity corresponding to an expected serving; in some places, where it is wished to serve them warm, or even simply to prevent them from drying, they are stored in a hot plate compartment.

OBJECTS OF THE INVENTION

It is an object of the present invention to provide an oven where such articles may be baked on a continuous basis and according to demand and, once baked, may be automatically dropped in a storage compartment where they are kept warm.

It is also an object of the present invention to provide such an oven with control means for causing the automatic fall of baked articles in the storage compartment after a pre-adjusted baking time has been completed.

It is also an object of the present invention to provide such an oven wherein the control means may be turned off so that it may be used for normal cooking without effecting the dumping of baked articles.

STATEMENT OF THE INVENTION

The present invention therefore relates to an oven for baking articles such as bread, cakes or the like comprising: a housing; a forwardly opening cavity defining a baking compartment; a door closing the cavity; a lower compartment located beneath the baking compartment for storing baked articles therein; the baking compartment having a bottom shelf separating the baking compartment and the lower compartment, the shelf being formed of a series of pivotably mounted plates adapted to hold articles to be baked; and means for pivoting the plates at predetermined time to cause articles baked in the baking compartment to fall under the action of gravity in the lower compartment.

Other objects and further scope of applicability of the present invention will become apparent from the detailed description given hereinafter; it should be understood, however, that the detailed description, while indicating preferred embodiments of the invention, is given by way of illustration only, since various changes and modifications within the spirit and scope of the invention will become apparent to those skilled in the art from reading the detailed description.

BRIEF DESCRIPTION OF THE DRAWINGS

FIG. 1 is a perspective view of an oven constructed in accordance with the present invention;

FIG. 2 is a cross-sectional elevation view taken along lines 2—2 of FIG. 1;

FIG. 3 is a front, partly cross-sectional, elevation veiw as seen from lines 3—3 of FIG. 1;

FIG. 4 is a schematic elevation view as seen from lines 4—4 of FIG. 2 and showing the oven plates in a horizontal position;

FIG. 5 is a view similar to FIG. 4, showing the plates in a pivoting position.

DESCRIPTION OF PREFERRED EMBODIMENTS

Figure 6:
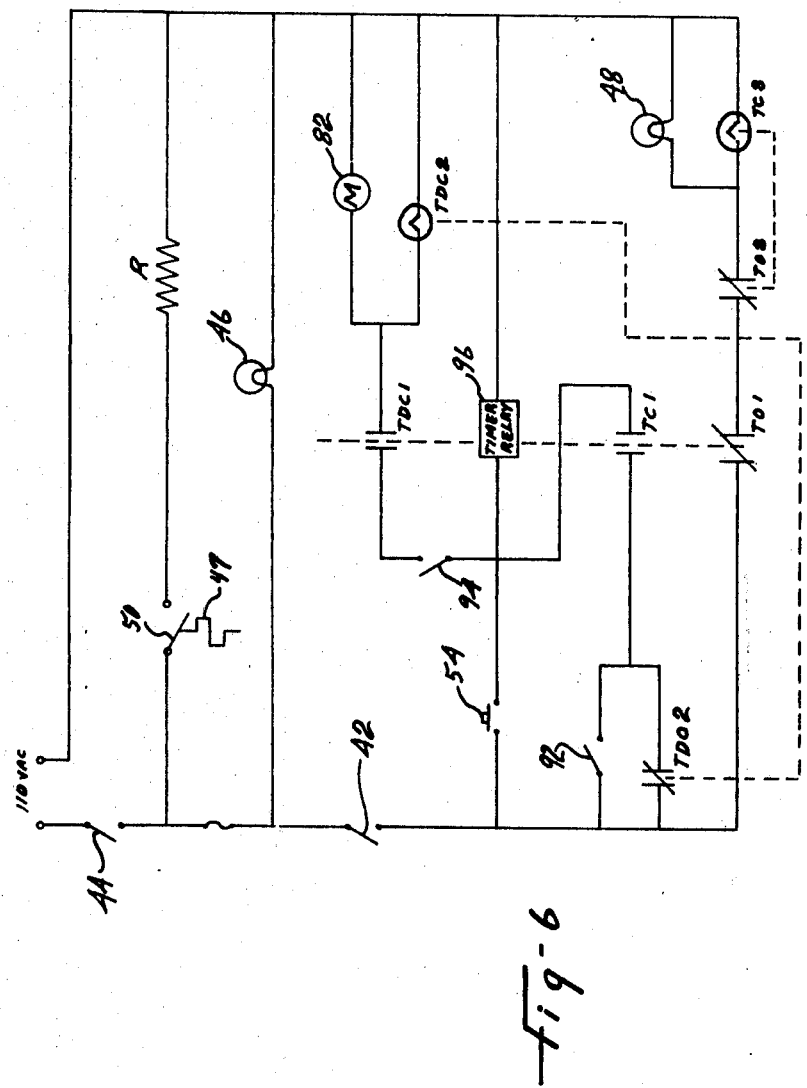
FIG. 6 is an electrical diagram for the operation of the oven of the present invention.

Referring to FIG. 1, there is shown, for illustrative purposes, a free-standing electric oven including a housing, generally denoted 10, with a forwardly opening cavity 12 defining a baking compartment. A door 14 closes the cavity. Housing 10 further includes a pull-out storage drawer 16 located beneath the baking compartment.

Referring to FIGS. 1-3, the baking compartment is defined by a pair of side walls 18 and 20, a rear wall 22 and a top wall 24. Thermal insulation 26 provided on the hidden faces of walls 18, 20, 22, 24 reduces the rate of heat transfer from the baking compartment to the outer walls 28, 30, 32 and 34 of housing 10.

The top wall 24 of the baking compartment is provided with a ventilation duct 36 to allow air to be evacuated through suitable openings 38 on the top outer wall 28 of housing 10. On the front face of housing 10, above door 14, an elongate panel 40 displays a series of manual and visual devices that include: a pair of switches 42 and 44, three lights 46, 47 and 48, a temperature selector 50, a time-setting button 52 and a push-button 54; the function of these devices will hereinafter be described.

On side walls 18, 20, there are respectively provided two grill supports 56, 58 and two heating units 60, 62. A third heating unit 64 may be provided on the rear wall 22 or alternatively, there may be provided only one heating unit of sufficient wattage to suit the purpose of the oven. One type of suitable heating unit is the one sold under the trademark Chromatox. A temperature sensing element 66 is mounted to rear wall 22.

The bottom shelf or surface of the baking compartment 12 is formed of a series of plates; in the drawings, four plates of identical shape are shown as 68, 69, 70 and 71. Each plate, at opposite end thereof, is pivotably mounted to a frame 72 fixed to the housing 10. In the embodiment illustrated, each plate includes, centrally thereof, a rod 68a, 69a, 70a, 71a (see FIG. 4) which has its opposite ends mounted in the front and rear channel members 72a, 72b forming the front and rear parts of frame 72.

The rear outer wall 32 of housing 10 is at some distance from rear wall 22 of the baking compartment so as to define a space 74 therebetween in which the rear extremities 68a, 69a, 70a and 71a extend (see FIG. 2). As shown in FIGS. 4 and 5, these extremities are interconnected by a series of linking members 75, 76, 77, 78, 79, 80, 81. These linking members are simultaneously operated by a motor 82 fixedly mounted to frame 72 in space 74 and operatively connected to the linking members via a speed-reducing gear arrangement 84 and further linking members 85 and 86. As can be seen, plates 68, 69 and plates 70, 71 are arranged in tandem wherein one tandem pivots in a direction opposite to the other tandem. With such arrangement, the space provided between two adjacent pivoted plates for the dropping of the baked articles 88 in the lower compartment 16 is equal to at least the width of a plate.

A counterweight 87 may be provided for balancing the weight of the linking members and for assisting the pivotal movement of the plates.

A small gap 90 should be provided at least between adjacent plates so that, when the plates are in a horizontal shelf position, heat flow from the baking compartment to the lower compartment is permitted through these gaps to maintain the articles in lower compartment warm.

A general description of the oven described above will now be given.

Articles to be baked are placed on the bottom shelf of the baking compartment and door 14 is closed. Switch 44 is pushed to the ON position and light 46 lights. The temperature selector 50 is set at the desired baking temperature and lamp 47 lights. Button 52 is adjusted at the desired baking time. As said above, the present invention is particularly concerned with means for automatically controlling the baking operation and the falling of the baked articles in the lower compartment. Therefore, switch 42 is pushed to the AUTO position whereby light 48 begins to flash, which flashing is stopped, as hereinafter described, as soon as push-button 54 is actuated in operation.

The operation of these control means will now be described with reference to FIG. 6 which shows the ON-OFF switch 44 and its lamp 46, the temperature selector 50 and its lamp 47, and resistance R generally representing the three heating elements 60, 62 and 64. The automatic control is on by closing switch 42. Immediate flashing of lamp 48 occurs due to current passing through normally closed contacts TO1 and TO3 (flashing is caused by the opening and closing of TO3 in response to current passing through the heat sensitive lamp TC3). This flashing occurs either at the beginning of the baking operation or after the baked articles have fallen into the lower compartment. Actuating push-button 54 causes the timer relay 96 to operate, which thereby opens contact TO1 (stopping flashing of lamp 48) and closes contact TC1. Once the baking time has been completed, contact TDC1 is closed causing motor 82 to be driven if switch 94 is closed (switch 94 is opened when the storage drawer 16 is in the pull-out position). The motor being driven, the plates pivot. As motor 82 is driven, it closes limit switch 92. TDC2 is a time delay lamp, similar to TC3, which, after a few seconds, causes the opening of TDO2. Thus, current is fed to motor 82 via the circuit that includes switch 92, closed contacts TC1, switch 94, contacts TDC1. After one complete revolution of the motor, the limit switch 92 is again opened cutting the current to the motor and returning the timer relay 96 to zero. Lamp TDC2 cools and TDO2 closes and is ready for the next baking operation. Also, with no current in the control circuit, TC1 and TDC1 open while TO1 closes causing lamp 48 to flash, as described above, indicating that more articles should be placed in the oven cavity for baking.

Although the invention has been described in relation to one specific form of the invention, it will be evident to the persons skilled in the art that it may be modified and refined in various ways. For example, some means may be provided in connection with the drawer to prevent it from being opened when the plates are rotating. Therefore, it should be understood that the present invention is not limited in interpretation except by the scope of the following claims.

What is claimed is:

1. An oven for baking articles such as bread, cakes or the like, comprising: a housing; a forwardly opening cavity in said housing defining a baking compartment; a door closing said cavity; a lower compartment located beneath said baking compartment for receiving baked articles therein; said baking compartment having a bottom shelf separating said baking compartment and said lower compartment, said shelf being formed of a series of pivotably mounted plates adapted to hold articles to be baked; and means for pivoting said plates at predetermined time to cause baked articles in said baking compartment to fall under the action of gravity in said lower compartment.

2. An oven as defined in claim 1, wherein said plates are mounted, at opposite ends thereof to said housing; futher comprising link means interconnecting said plates at one end thereof; and drive means operatively connected to said link means for actuating said link means and causing the pivotal movement of said plates.

3. An oven as defined in claim 2, further comprising counterweight means mounted to said link means for assisting the pivotal movement of said plates.

4. An oven as defined in claim 2, further comprising control means for actuating said drive means at pre-adjusted baking time.

5. An oven as defined in claim 4, wherein said lower compartment includes a pull-out storage drawer; said control means including switch means for preventing said drive means to operate when said drawer is in a pull-out position.

6. An oven as defined in claim 4, wherein said control means further include flashing means disposed externally on said housing for indicating that the baked articles have been transferred to said lower compartment and said baking compartment is ready for further articles to be baked.

7. An oven as defined in claim 4, wherein said link means are interconnected so that said plates, when in a substantially vertical pivoted position, are spaced from one another a distance at least equal to the width of a plate.

8. An oven as defined in claim 1, wherein said plates, when in a horizontal plane, are spaced from one another a small distance to allow heat convection from said baking compartment to said lower compartment.

* * * * *